United States Patent [19]
van der Tol

[11] Patent Number: 5,887,092
[45] Date of Patent: Mar. 23, 1999

[54] OPTICAL NON-LINEAR BRANCHING ELEMENT WITH MZ INTERFEROMETER

[75] Inventor: Johannes Jacobus Gerardus Maria van der Tol, Zoetermeer, Netherlands

[73] Assignee: Koninklijke KPN N.V., Groningen, Netherlands

[21] Appl. No.: 891,986

[22] Filed: Jul. 14, 1997

[30] Foreign Application Priority Data

Jul. 24, 1996 [NL] Netherlands ............................ 1003669

[51] Int. Cl.$^6$ .............................. G02B 6/24; H04B 10/00
[52] U.S. Cl. ................................. 385/27; 385/1; 385/39; 385/122
[58] Field of Search ............................... 385/1–3, 14, 15, 385/27, 39, 40–42, 122

[56] References Cited

U.S. PATENT DOCUMENTS

| | | | |
|---|---|---|---|
| 5,315,422 | 5/1994 | Utaka et al. | 359/107 |
| 5,418,868 | 5/1995 | Cohen et al. | 385/16 |
| 5,611,007 | 3/1997 | Wolf et al. | 385/14 |

FOREIGN PATENT DOCUMENTS

| | | | |
|---|---|---|---|
| 0 482 461 A1 | 4/1992 | European Pat. Off. | 385/27 |
| 2 250 606 | 6/1992 | United Kingdom | 385/43 |

OTHER PUBLICATIONS

"Proposal For A New All–Optical Waveguide Functional Device", Hitoshi Kawaguchi, Optics Letters, vol. 10, No. 8. pp. 411–413, Aug. 1985.

H. Kawaguchi; "Proposal for a new all–optical waveguide functional device"; Aug. 1985, pp. 411–413; Optics Letters; vol. 10, No. 8.

G. Krijnen et al; "Modelling of a versatile all–optical machzehnder switch"; 1994; pp. 187–196; International Symposium.

T. Shi et al; "Nonlinear wave propagation in an asymmetric converging Y junction"; Jul. 15, 1991; pp. 1077–1079; Optics Letters vol. 16, No. 14.

Patents Abstracts of Japan, vol. 13, No. 502; & JP 01 201627 (Nippon Telegraph & Telephone), Aug. 1989.

G. Krijnen et al; "Simulation of Low Insertion Loss Non–linear Y–Junctions"; Nov. 15, 1990; Sensors & Acutators (Optical Transducers), Proceedings S&A Symposium of the University of Twente, Enshede.

H. Fouckhardt et al; "All–Optical Switching in Waveguide X–Junctions"; May 1990; pp. 803–809; Journal of the Optical Society of America; vol. 7, No. 5.

T. Kaino et al; "Ultrafast Nonlinear Optical Switches"; Sep. 1995; pp. 47–56; NTT Review; vol. 7, No. 5.

Primary Examiner—John D. Lee
Assistant Examiner—Victoria D. Hao
Attorney, Agent, or Firm—Frishauf, Holtz, Goodman, Langer & Chick

[57] ABSTRACT

A low-loss optical 1×2 branching element comprises a symmetrical coupler ($C_s$) with a symmetrical power distribution (½/½) and an asymmetric coupler ($C_a$) with an asymmetric power distribution ({(½−x)/(½+x)}). Outputs (c,d) of the symmetrical coupler are coupled to inputs (e,f) of the asymmetric coupler, so that an MZ interferometer with two branches ($t_1$, $t_2$) is formed between the two couplers. The branches incorporate, preferably identical, optical non-linear elements (NL1, NL2), while moreover the branches exhibit an additional difference in linear optical path length (ΔL) that depends on the type of couplers selected. In one signal direction (arrow D) the branching element acts as a 3 dB splitter. The elements (NL1, NL2) and the coupler ($C_a$) have been dimensioned so as to result in a loss <<3 dB for a given signal power in the other signal direction (arrow U).

7 Claims, 3 Drawing Sheets

OPTICAL NON-LINEAR BRANCHING ELEMENT WITH MZ INTERFEROMETER

BACKGROUND OF THE INVENTION

1. Scope of the Invention

The invention is in the field of optical devices for systems transporting and processing optical signals. More in particular it relates to an optical 1×2 branching element provided with three optical ports, in which an optical signal injected via a first optical port is split into two signals of equal power that exit via a second and a third optical port respectively, and in which an optical signal injected via the second or third port exits via the first optical port.

2. State of the Art

The splitting of optical signals is one of the most important basic functions in optical systems and networks. Optical signal splitters based on channel-shaped waveguides, such as optical fibers or integrated waveguide structures, are based on two fundamentally different physical principles. One type of signal splitter uses interference, e.g. the directional coupler and the splitter based on an MZ-interferometer. The second type of signal splitter uses symmetry, e.g. the symmetrical Y splitter and the asymmetric Y splitter dimensioned as mode filter.

For passive optical networks (PONs), used for both signal distribution and bidirectional traffic, and which have a tree-like branched structure, usually with a high degree of bifurcation, signal splitters are required on a large scale. For this purpose, (1→N) splitters are being designed which are mostly composed of (1→2) splitters of the above-mentioned types. In each (1→2) splitter, the optical signal is subject to a reduction in power of 3 dB in each of the two bifurcation directions. This is unavoidable (and natural) in the direction of further bifurcation (downwards), as the presented signal divides itself between the two possible bifurcation directions. Owing to time-reversal invariance (reciprocity) to which physical laws are subject, within the same structure this reduction also occurs for optical signals in the opposite direction (upwards), but this time as a real loss of signal. One way to avoid this loss in the upward direction is to let the wave-guiding structure in upward direction be different from that in downward direction. This can be achieved by switching the signals, e.g. with the use of externally, electrically or optically, controlled switches. However, this has the drawback that such a network no longer is passive, and in addition requires a complicated control system for the many switches.

Another option is the application of non-linear optical effects in the splitting structure indicated above, enabling a light signal itself to cause a switching effect to occur. Reference [1] discloses a simulation study of a symmetrical Y junction with a monomodal trunk and two monomodal branches, the branches of which at least are formed by identical waveguide section in a non-linear optical medium. As a result of the symmetry, power splitting occurs in the bifurcation direction (downwards). In the upward direction, a light signal presented through either of the branches causes the index of refraction to increase, as a result of which the symmetry is broken. This causes the Y junction to become asymmetric and to act as a mode filter for the said signal: the light signal propagates fully as a zero-order mode signal in the trunk of the Y junction (Remark: in the above-mentioned types of (1→2) splitter, one part (half) is always converted into a first-order mode, said part dispersing upon entering the monomodal trunk of the Y junction, resulting in the loss of power mentioned). In reference [2], an asymmetric X junction in a non-linear medium has been numerically investigated that enables an optical signal to be switched using an optical control signal to be injected separately. Said control signal exhibits a similar switching effect (see more in particular FIG. 4(c) and FIG. 5(c) of reference [2]) as described previously for the non-linear Y junction of reference [1]. A drawback of the splitting structures described in reference [1] and [2] is that either they require extremely high optical powers, or relatively large non-linear optical effects are required, for which no suitable materials are available to date.

SUMMARY OF THE INVENTION

The object of the invention is to provide a branching element that has the desired property with regard to low power losses of splitter structures as described above, but in which the required non-linear effects can remain limited to a much greater degree, enabling it to be realized at the present state of the art. It is based on the fact that in interferometric structures, such as those based on an MZ interferometer, instead of using absolute changes in the index of refraction, phase changes in optical signals are used. Said phase changes are determined by the product of the change in the index of refraction and the length of the optical path along which the change in the index of refraction is realized ($\delta\Phi = \delta n \times L$). This means that the length of the optical path can serve as an enlarging factor, enabling relatively small non-linear effects to be used for switching purposes, as long as the optical path length is sufficient.

For this purpose, a branching element of the above-mentioned type, comprised an optical power splitter provided with an input channel and two output channels, and a non-linear waveguide section that forms a light-conducting path through a medium with an intensity-dependent index of refraction, wherein the branching element in addition comprises an optical power coupler, which is provided with two input channels and two output channels, and each of the output channels of the power splitter is coupled with another of the input channels of the power couple, thus forming a Mach-Zehnder interferometer with two waveguide branches, in which the non-linear waveguide section is incorporated in a first of the two waveguide branches. The input channel of the power splitter forms the first port, and the first and second output channel of the power coupler form the second and third port respectively, and the power coupler has an asymmetric power distribution.

For both a power splitter and power coupler, different possible realizations exist which are based on different physical principles, such as directional coupling and adiabatic coupling, and which may be accompanied by characteristic extra difference in phase when a signal is split. In a preferred embodiment, the two waveguide branches of the MZ interferometer have an additional difference in linear optical path length that compensates the phase characteristic for the chosen type of power splitter and/or coupler.

In a further preferred embodiment, identical non-linear waveguide sections are incorporated into each of the two waveguide branches. As a result of this, the operation of the branching element in the signal splitting direction, i,e. upon injection of an optical signal via the first port, is independent of the intensity of the injected signal.

Further, preferred embodiments are aimed at realizing the branching element in an integrated form, and aimed at an embodiment using optical fibers.

Reference [3] discloses an optical logical element that can be used to perform an XOR function. This logical element comprises a waveguide structure based on an MZ interferometer, in which in each of the two waveguide branches, an element that can be phase-modulated is incorporated, the index of refraction of which undergoes a change when it is struck by light from outside the waveguide structure. For these elements that can be phase-modulated, non-linear optical materials are used, e.g. in a semiconductor system based on InP in a MQW (Multiple Quantum Well) structure. Such non-linear optical materials in a structure identical to that in which the element that can be modulated has been realized, can in principle also be used as the waveguide sections of the branching element according to the invention, in which however, the changes in the index of refraction are not caused by light from an exterior source, but solely by changes in intensity of the light signals propagating within the waveguide sections themselves.

REFERENCES

[1] G. J. M. Krijnen et al., "Simulation of low insertion loss non-linear Y junctions", Sensors & Actuators (Optical Transducers), Proceedings S&A symposium of the University of Twente, Enschede, The Netherlands, Nov. 15–16, 1990, University of Twente/Kluwer Technical Books, Deventer-Antwerpen, pp. 323–328;
[2] H. Fouckhardt and Y. Silberberg, "All-optical switching in waveguide X junctions", J. Opt. Soc. Am. B, Vol. 7, No. 5, May 1990, pp. 803–809;
[3] U.S. Pat. No. 5,215,422;
[4] T. Kaino et al., "Ultrafast non-linear optical switches", NTT Review, Vol. 7, No. 5, September 1995, pp. 47–56.

All references are deemed to be incorporated into the present application.

SHORT DESCRIPTION OF THE DRAWING

The drawing will be explained in greater detail by means of a description of an exemplary embodiment, with reference to a drawing containing the following figures.

DESCRIPTION OF AN EXEMPLARY EMBODIMENT

Figure 1:
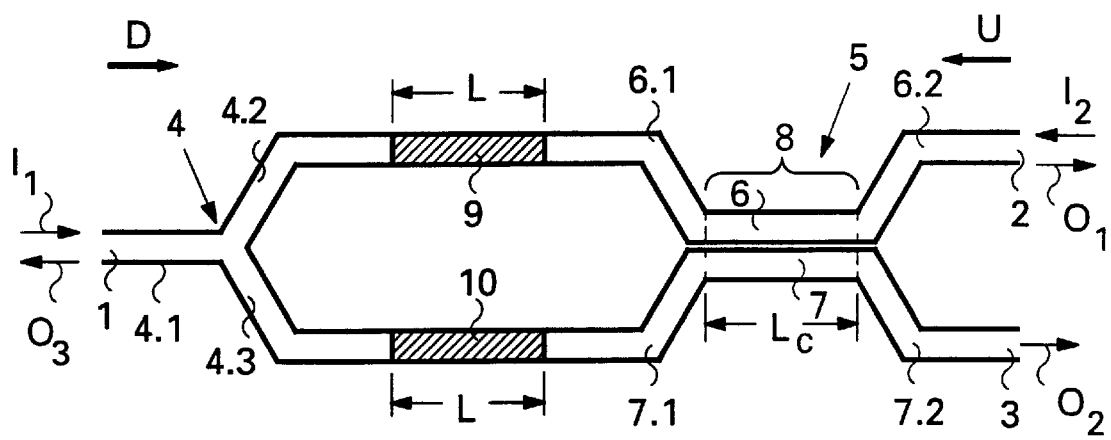
FIG. 1 shows a schematic diagram of an optical branching element according to the invention, in which a directional coupler is used with an asymmetric power distribution.

FIG. 1 shows a schematic diagram of a wave guide pattern for an optical branching element according to the invention. The branching element is provided with three ports 1, 2, and 3. In one signal direction (arrow D), referred to as the downward signal direction, the first port 1 serves as an optical signal input, and the second and third ports 2 and 3 serve as optical signal outputs. In the opposite signal direction (arrow U), referred to as the upward signal direction, the second and third ports 2 and 3 serve as signal inputs, and the first port 1 serves as signal output. The waveguide pattern of the branching element comprises a symmetrical Y junction 4 and a directional coupler 5. The Y junction 4 is provided with a trunk 4.1 and two branches 4.2 and 4.3. The directional coupler 5 is formed by two generally identical waveguides 6 and 7, which run parallel in coupling area 8 for a length $L_c$, and which are coupled, and which have offshoots 6.1 and 7.1 on one side of the coupling area, and offshoots 6.2 and 7.2 on an opposite side of the coupling area. By means of non-linear elements 9 and 10, the branches 4.2 and 4.3 are linked with, respectively, the offshoots 6.1 and 7.1 of the waveguides 6 and 7, in such a manner that an MZ interferometer with two generally identical arms is formed between the Y junction and the input of the directional coupler. One end of the trunk 4.1 of the Y junction forms the first port 1, while the offshoots 6.2 and 7.2 of the directional coupler 5 form the second port 2 and the third port 3, respectively. The nonlinear elements 9 and 10 are waveguide sections which along a length L lead through an optical medium with an intensity-dependent index of refraction, e.g. as a result a Kerr type non-linearity. The coupling length $L_c$ is such that the directional coupler 5 has a power distribution PR which can be expressed by $\{(\frac{1}{2}-x)/(\frac{1}{2}+x)\}$, and which will hereinafter be referred to as asymmetric power distribution. In this, x (with $0<x<\frac{1}{2}$) represents the fraction with which PR deviates from a symmetrical power distribution, i.e. $\{\frac{1}{2}/\frac{1}{2}\}$.

The purpose of the principle of the configuration shown in FIG. 1 is that light signals in downward direction (arrow D) which enter via port 1 experience a fully symmetrical configuration, whereas the symmetry of the configuration in upward direction (arrow U) is disturbed by light signals that enter either via port 2 or via port 3.

In the downward direction (arrow D), the operation is as follows. A light signal $I_1$ entering via the first port 1 of the branching element, is divided, in the Y junction 4, into signal parts of equal intensity among the branches 4.2 and 4.3. Owing to the identical intensity, these signal parts are not subject to a relative phase shift in the non-linear elements 9 and 10, and as a result they arrive with equal amplitude and phase via offshoots 6.1 and 7.1 in the coupling area 8 of the directional coupler 5. In the directional coupler, both signal parts are divided according to the (same) asymmetric power distribution among the offshoots 6.2 and 7.2. The signals $O_1$ and $O_2$ exiting at ports 2 and 3 have generally equal intensities, which are about half the intensity of the signal $I_1$ entering at port 1. In the downward signal direction, the branching element therefore acts as a 3 dB splitter.

In the upward signal direction (arrow U), the operation is different. A light signal $I_2$ entering via port 2, owing to the asymmetric power distribution PR of the directional coupler 5 is divided among the two offshoots 6.1 and 7.1 in signal parts of different intensity and—characteristically for a directional coupler—with an intrinsic phase shift of 90°. As a result of the difference in intensity, these signal parts moreover experience a relative non-linear phase shift in the respective non-linear sections 9 and 10. If this non-linear phase shift exactly compensates the 90° difference in phase of the directional coupler 5, the two signal parts will arrive at the Y junction 4. However, they still differ in intensity, i.e. amplitude, as a result of the asymmetry (fraction x) in the power distribution of the directional coupler. In the Y junction, the signal parts are combined into a signal with a symmetrical field distribution and a signal with an asymmetric field distribution. The signal with the symmetrical field distribution propagates as a zero-order mode signal in the trunk 4.1, while the signal with the asymmetric field distribution, as a first-order mode signal, cannot propagate in the trunk 4.1 and will consequently radiate off. The part of the signal power lost through radiating off is determined by the difference in amplitude, which in turn is directly related to the fraction x. In the following it will be demonstrated that in each instance, for each x (with $0<x<½$), the greater part of the signal power will always propagate as a zero-order mode signal via the trunk 4.1 to the port 1. For a light signal $I_2$ entering via port 3, the branching element has exactly the same effect, albeit that all the amplitude and phase distributions will be mirrored relative to the axis of symmetry of the branching element's structure. This means that in the upward signal direction the excess loss of the branching element will always be less than the usual 3 dB of the known passive branching elements.

In order to be able to efficiently use the non-linear effect, the value of x (the deviation from the symmetrical power distribution) must be relatively large, whereas the losses occurring in the process must remain small. The fact that this is possible will be apparent from the following calculation. For the sake of simplicity, the calculation is based on a normalization in which an optical signal $I_2$ entering via port 2 or port 3 is a signal with amplitude "1" and power "1". Past the coupling area 8 in the directional coupler 5, this signal is divided among the two offshoots 6.1 and 7.1 into two signal parts the powers of which are given by $i_1=(½-x)$ and $i_2=(½+x)$ respectively, corresponding to amplitudes $a_1=(½-x)^{1/2}$ and $a_2=(½+x)^{1/2}$ respectively. Upon entering the Y junction 4, the signal parts are in phase and are combined into a zero-order mode signal and a first-order mode signal, the amplitude $A_0$ of the zero-order mode signal being given by the expression:

$$A_0 = ½√2 \times \{a_1+a_2\} = ½√2\{(½-x)^{1/2}+(½+x)^{1/2}\} \quad (1)$$

The power corresponding to this amplitude is therefore $|A_0|^2$, so the loss LS (defined as the ratio of the signal powers of the signals $I_2$ and $O_3$) is given by:

$$LS = |A_0|^{-2} = \{½+(¼-x^2)^{1/2}\}^{-1} \quad (2)$$

Figure 2:
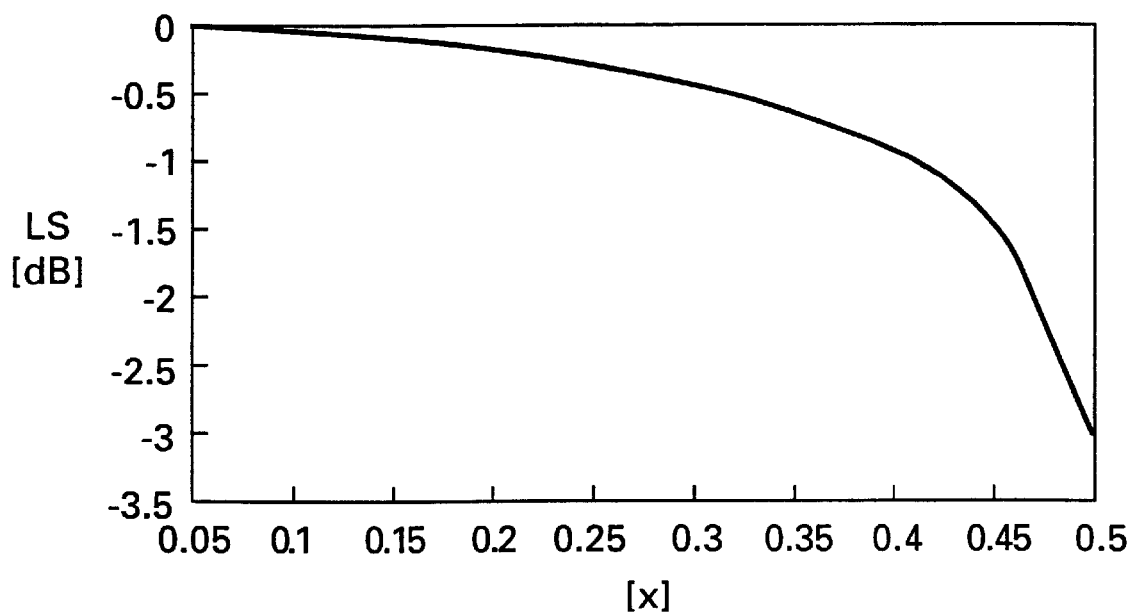
FIG. 2 shows a graphical diagram of the loss (LS) in optical signal power in the upward signal direction (arrow U) in an optical branching element according to FIG. 1, as a function of the deviation (x) from a symmetrical power distribution.

In FIG. 2, LS has been graphically plotted (in dB) as a function of x. FIG. 2 shows that even with x=¼ the loss remains limited to a fraction of 1 dB, in this case approx. −0.3 dB.

Figure 3:
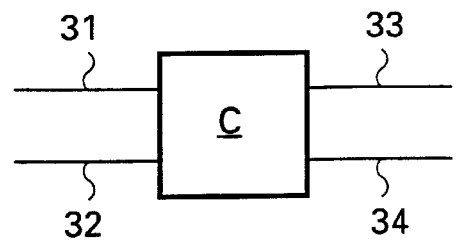
FIG. 3 shows a schematic diagram of a 2×2 coupler in its most common form.

The branching element can also be executed with a different type of coupler instead of the directional coupler. Also, the Y junction can be replaced by a 2×2 coupler one port of which is not used. This enables the branching element to be realized both in an integrated form and with glass fibers. In doing do, the fact that other types of couplers exhibit other intrinsic phase shifts in the output signals must be taken into account. To any (optical) 2×2 coupler C with two input ports 31 and 32, and two output ports 33 and 34, as shown schematically in FIG. 3, the following applies in general. (Note: The designations 'input port' and 'output port' serve to distinguish the ports in a relative way only. With a signal in the opposite direction, the output ports 33 and 34 are used as input ports, with the input ports 31 and 32 acting as output ports.) If a signal $S_i$, applied to a first input port 31, divides among the two output ports 33 and 34 into part signals $S_{u1}$ and $S_{u2}$ with a relative difference in phase $\Phi$, an identical signal $S_i$ applied to the second input port 32 will divide among the two output ports 33 and 34 into part signals $S_{u1}$ and $S_{u2}$ with a relative difference in phase $\Phi-180°$. In the opposite signal direction, i.e. for a signal presented at output port 33 or 34, the phase behaviour of the coupler is identical. The difference in phase varies according to the type of coupler. As used previously, $\Phi=90°$ applies in the case of the directional coupling. For an adiabatic 3 dB coupler, e.g. in the form of an asymmetric X junction, $\Phi=0°$ applies.

Figure 4:
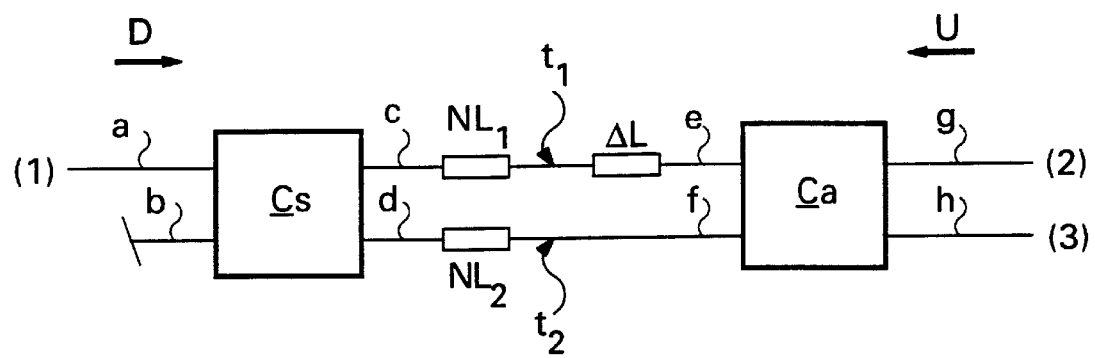
FIG. 4 shows a schematic diagram of an optical branching element according to the invention, based on two 2×2 couplers as shown in FIG. 3.

FIG. 4 shows a schematic diagram of an optical branching element in its most general form, in which two optical 2×2 couplers are used, i.e. a coupler Cs with a symmetrical power distribution (½/½) and a coupler Ca with an asymmetric power distribution $\{(½-x)/(½+x)\}$. The couplers Cs and Ca will hereinafter be referred to as the symmetrical coupler and the asymmetric coupler, respectively. The symmetrical coupler Cs has input ports a and b, and output ports c and d. The asymmetric coupler Ca has input ports e and f, and output ports g and h. The output ports c and d are coupled to the input ports e and f, respectively, so an MZ interferometer with two branches $t_1$ and $t_2$ is formed between the couplers Cs and Ca. In the two branches $t_1$ and $t_2$, a first optical non-linear element NL1 and a second optical non-linear element NL2 have been included, respectively. For the downward signal direction (arrow D), the input port a of the coupler Cs, and the output ports g and h of the coupler Ca respectively form the only signal input and the two signal outputs of the branching element, while for the upward signal direction (arrow U), these ports respectively form the only signal output and the two signal inputs of the branching element. The input port b of the coupler Cs is not used in this case. Let the couplers Cs and Ca exhibit the differences in phase $\Phi s$ and $\Phi a$, respectively. In the downward signal direction (arrow D), a signal $I_1$ presented via the input port a of the coupler Cs, will divide into two part signals of equal power among the two output ports c and d with a difference in phase: $\delta\Phi_D(c,d)=\Phi_s$. These two partial signals propagate via the branches $t_1$ and $t_2$ in the direction of the input ports e and f of the coupler Ca. In order that, ultimately, the input signal $I_1$ will result in output signals $O_1$ and $O_2$ of equal power (approx. half the power of the input signal $I_1$), the part signals must arrive at the input ports with a difference in phase: $\delta\Phi_D(e,f)=\Phi_a+90°$. This means that the branches for signals of equal power must have a difference in optical path length that will result in a difference in phase: $\delta\Phi=\Phi_a+90°-\Phi s$. In upward direction, a signal $I_2$ presented at the output port g of the coupler Ca will divide into signal parts of unequal power among the input ports e and f, and in addition, with a difference in phase: $\delta\Phi_{Ug}(e,f)=\Phi_a$. A signal $I_2$ presented at the output port h of the coupler Ca will also divide into signal parts of unequal power among the input ports e and f, but with a difference in phase: $\delta\Phi_{Uh}(e,f)=\Phi_a+180°$. In both cases, the signal parts must arrive at the output ports c and d with a difference in phase: $\delta\Phi_U(c,d)=\Phi_s$ to be able to exit the symmetrical coupler Cs via the input port a in combination.

A first possibility to achieve this comprises the following two measures:

(i) by choosing the two non-linear elements NL1 and NL2 to be equal and by dimensioning them so that a difference in phase of 90° corresponds to the difference in intensity of the signal parts in the branches in the upward direction (arrow U), and (ii) by means of an extra difference in linear optical path length $\Delta L$ between the two branches $t_1$ and $t_2$, which corresponds to a difference in phase $\Phi_a-\Phi_s+90°$. This means that the non-linear elements NL1 and NL2 can always be selected equal, while the choice of a certain type of coupler for either or both of the couplers Cs and Ca can be compensated with a suitably chosen difference in linear optical path length.

A second possibility is achieved with the following two measures:

(i') by including a non-linear element in one of the two branches only, e.g. $t_2$ (symbolically expressed by NL1=0 and NL2≠0), and by dimensioning NL2, with the difference in intensity used in the downward signal direction, for a difference in phase of 180°, and (ii') by dimensioning the additional difference in linear optical path length $\Delta L$ between the two branches $t_1$ and $t_2$ so that, with the signal intensity used in the downward signal direction, this corresponds to a difference in phase $\Phi_a - \Phi_s + 90°$. However, owing to the symmetry of an identical non-linear element (NL1=NL2) in each of the two branches of the MZ interferometer, the first possibility offers the advantage over the second possibility that the effect of the branching element in the downward direction is independent of the signal intensity.

In an integrated version of the branching element, the non-linear elements 9 and 10 in FIG.1 may be realized by means of waveguide sections formed on a basis of InP in a MQW structure as disclosed by reference [3]. If this structure has a non-linear constant $n_2 = 10^{-4}$ cm$^2$/W and a waveguide cross section of 10 $\mu m^2$, in order to achieve a difference in phase of 90° with an incoming signal power of 0.1 mW of an optical signal with a wavelength of 1.5 $\mu$m, and an asymmetry x=0.25 in the power distribution of the directional coupler 5, the non-linear elements each must have a length L=7.5 $\mu$m. If the signal power is ten times that value (or one-tenth of it), L is selected to be shorter (longer) by a factor of ten.

A directional coupler in integrated optics corresponds with a fused coupler made by fusing two separate optical fibers (of glass-like materials). Using fused couplers of standard optical (monomode) fibers, both symmetrical couplers (3 dB couplers) and asymmetric couplers {(½−x)/(½+x)} with a well-defined power distribution can be realized. Non-linear optical fibers are known per se, e.g. from reference [4]. Therefore, the branching element can in principle be simply realized using glass fibre techniques, i.e. one symmetrical and one asymmetric fused coupler linked together along two equal sections of non-linear optical fibre as branches of an MZ interferometer, and in which one of the branches incorporates an additional length of standard glass fibre (corresponding to a difference in phase of 90°). However, generally speaking, the non-linear optical constants $n_2$ of non-linear optical fibers, as referred to in reference [4], are smaller than those of MQW structures by a factor of $10^{-10}$. In order to achieve the required difference in phase of 90° using the former, the length of both non-linear elements, assuming a fiber core crosssection of approx. 100 $\mu m^2$ and a signal power of approx. 10 mW, should be of the order of magnitude of several kilometers.

The proper operation of the branching element requires that light signals in upward direction (arrow U) are not presented simultaneously to ports 2 and 3. This poses no problems when used in a passive optical network, as in an upward direction, the optical signal transmitted by different transmitters must be placed in different time slots (TDMA) in order to be transported at higher levels in the network.

Figure 5:
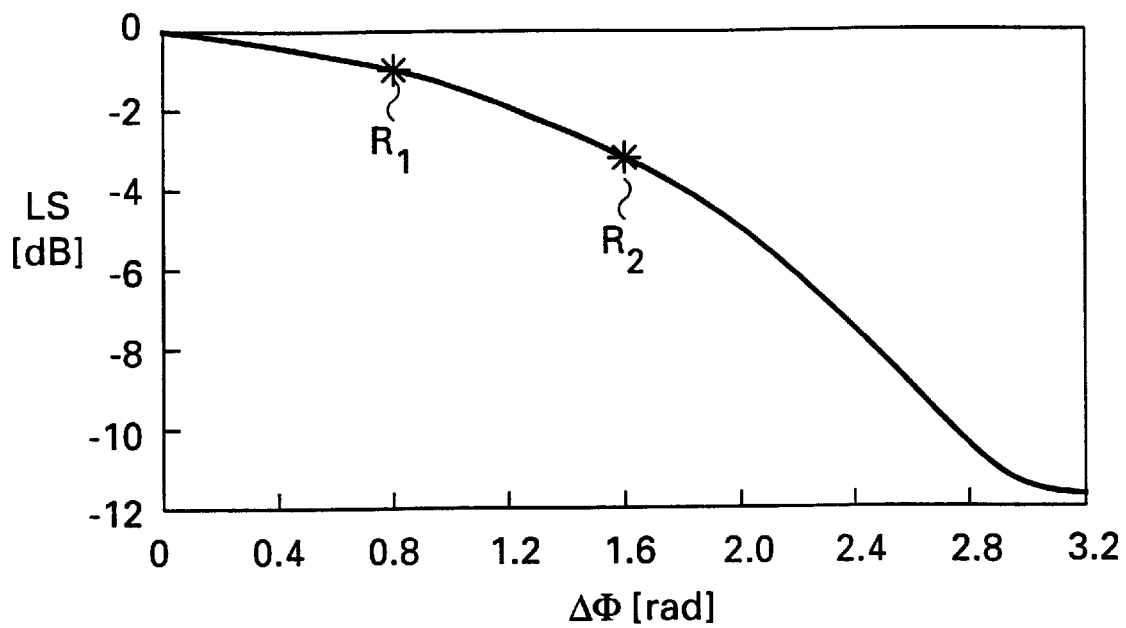
FIG. 5 shows a graphical diagram of the loss (LS) in optical signal power in the upward signal direction in a branching element according to FIG. 1, as a function of a deviation in phase ($\Delta\Phi$)
Figure 6:
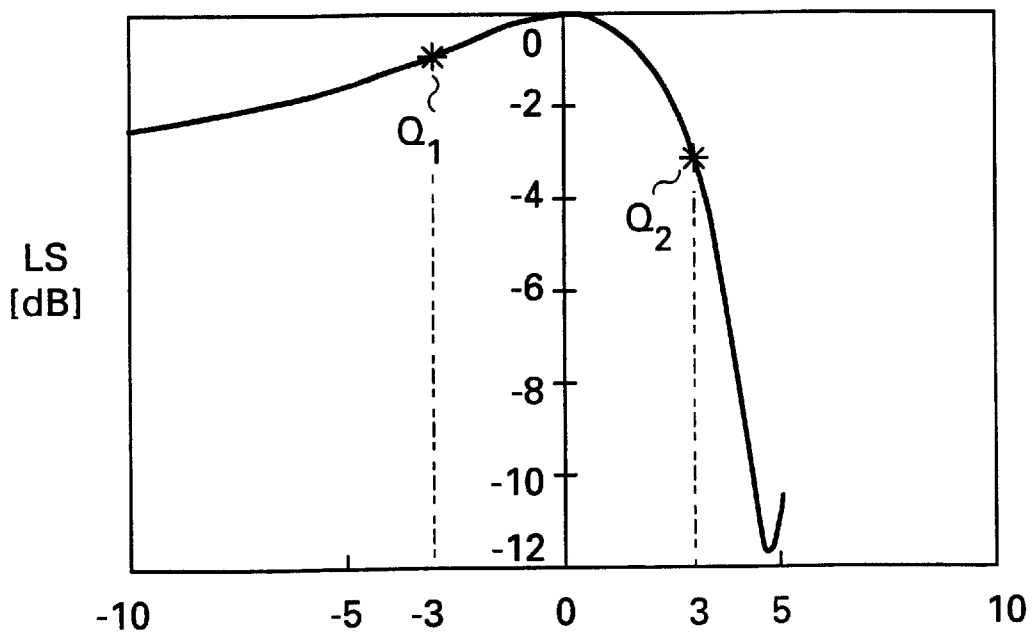
FIG. 6 shows in a similar manner as FIG. 5 the loss as a function of a power deviation ($P/P_0$) of an optimum value.

The presence of non-linear elements makes the operation signal power-dependent. If the optical signal is an intensity-modulated digital signal, in which "zeroes" and "ones" alternate as signal conditions with low and high intensity, the branching element will in fact allow only the "ones" to pass, not the "zeroes". As this results in an improved extinction ratio, this will be an advantage for such signals. Generally speaking, variations in the signal power will have the result that the difference in phase caused by the non-linear effect will not always have the optimum value to cause as much signal power in the zero-order mode as possible to be absorbed in the symmetrical coupler Cs (or, additionally, the Y junction 4 of FIG. 1), resulting in an increased loss in the branching element. For a branching element with a directional coupler (x=0.25) as shown in FIG. 1, FIG. 5 shows a graphical representation of the correlation of the loss LS (dB) as a function of the phase error $\Delta\Phi$ (rad), i.e. the deviation in phase from the optimum phase difference of 90° (½π≈1.58 rad). In a similar manner, FIG. 6 shows the loss LS (dB) as a function of the ratio P/P$_0$ (dB) of the presented signal power (P) relative to the optimum signal power (P$_0$). The diagrams show that a reduction in signal power by a factor of 2 (−3 dB) results in an increase of the loss LS in the Y junction to −0.9 dB (see point $Q_1$ in FIG. 6), and in an increase of the phase error to approx. 45° (≈0.8 rad) (see point $R_1$ in FIG. 5). An increase in power by a factor of 2 (+3 dB) however, results in a loss of approx. −3 dB (see point $Q_2$ in FIG. 6) and a phase error of approx. 90° (≈1.58 rad) (see point $R_2$ in FIG. 5). This means that, in case of deviations from the optimum signal power, increases in power should be more closely controlled than decreases in power. Even at a signal power attenuated by 10 dB, the loss in the branching element still is less than in a linear splitter. In order to achieve a high tolerance for power variations, the operational power is preferably chosen to be slightly less than the optimum switching power, e.g. 40% (−4 dB). Although in doing so the loss in the branching element is not optimal (approx. 1 dB), the permitted power variation, within which the loss is still better than for a linear splitter, is at its greatest value (approx. ±6 dB).

I claim:

1. An optical branching element provided with three optical ports, in which an optical signal injected via a first optical port is split into two signals of equal power that exit via a second and a third optical port respectively, and in which an optical signal injected via the second or third port exits via the first optical port, said branching element comprising an optical power splitter provided with an input channel and two output channels, and a non-linear waveguide section that forms a light-conducting path through a medium with an intensity-dependent index of refraction, wherein the branching element in addition comprises an optical power coupler, which is provided with two input channels and two output channels, and each of the output channels of the power splitter is coupled with another of the input channels of the power coupler, thus forming a Mach-Zehnder interferometer with two waveguide branches, in which the non-linear waveguide section is incorporated in a first of the two waveguide branches, in which the input channel of the power splitter forms the first port, and the first and second output channel of the power coupler form the second and third port respectively, and in which the power coupler has an asymmetric power distribution.

2. An optical branching element according to claim 1, wherein the waveguide branches of the MZ interferometer in addition have a difference in linear optical path length that depends on the types of power splitter and power coupler selected.

3. An optical branching element according to claim 2, wherein an additional non-linear waveguide section, of the same type as and generally identical to the first waveguide section mentioned, has been incorporated in the second of the two waveguide branches.

4. An optical branching element according to claim 3, wherein the power coupler and the power splitter have been designed as channel-shaped waveguide structures in a layer of light-conducting material on a substrate, and that the non-linear waveguide sections are MQW structures in semiconductor material, which have been incorporated between the respective output and input channels of the power coupler and power splitter.

5. An optical branching element according to claim 3, wherein the power coupler and the power splitter have been designed as fused couplers of standard optical fibers, and that the non-linear waveguide sections are portions of non-linear optical fibers that have been incorporated between the respective output and input channels of the power coupler and power splitter.

6. An optical branching element according to claim 2 wherein the power coupler and the power splitter have been designed as channel-shaped waveguide structures in a layer of light-conducting material on a substrate, and that the non-linear waveguide sections are MQW structures in semiconductor material, which have been incorporated between the respective output and input channels of the power coupler and power splitter.

7. An optical branching element according to claim 2 or 3, wherein the power coupler and the power splitter have been designed as fused couplers of standard optical fibers, and that the non-linear waveguide sections are portions of non-linear optical fibers that have been incorporated between the respective output and input channels of the power coupler and power splitter.

\* \* \* \* \*

UNITED STATES PATENT AND TRADEMARK OFFICE
CERTIFICATE OF CORRECTION

Page 1 of 5

PATENT NO. : 5,887,092
DATED : March 23, 1999
INVENTOR(S) : J.J.G.M. VAN DER TOL It is certified that error appears in the above-identified patent and that said Letters Patent is hereby corrected as shown below:

Column 4, line 10, change "L,," to --$L_c$--;

Column 5, line 42, change "$x^2)^{1/2}$} 311" to --$x^2)^{1/2}$} -1--;

Column 6, line 3, after "phase" insert --$\Phi$--;

Column 8, line 66 (claim 2, line 4), change " the types" to --characteristics--; after "of" insert --the--, and after "and" insert --the--;

Column 8, line 67 (claim 2, line 5), delete "selected";

Column 9, line 2 (claim 3, line 2), change "an" to --a substantially identical-- and delete ", of the";

Column 9, line 3 (claim 3, line 3), delete entire line;

UNITED STATES PATENT AND TRADEMARK OFFICE
CERTIFICATE OF CORRECTION

PATENT NO. : 5,887,092
DATED : March 23, 1999
INVENTOR(S) : J.J.G.M. VAN DER TOL It is certified that error appears in the above-identified patent and that said Letters Patent is hereby corrected as shown below:

Column 9, line 4 (claim 3, line 4), change "section mentioned, has been" to --is--;

Column 9, line 7 (claim 4, line 2), delete "have been";

Column 9, line 8 (claim 4, line 3), change "designed as" to --comprise--;

Column 9, line 9 (claim 4, line 4), delete "that";

Column 9, line 10 (claim 4, line 5), change "are" to --comprise--;

Column 9, line 11 (claim 4, line 6), change ", which" to --that--;

Column 9, line 13 (claim 4, line 8), after "and" insert --the--;

UNITED STATES PATENT AND TRADEMARK OFFICE
CERTIFICATE OF CORRECTION

Page 3 of 5

PATENT NO. : 5,887,092
DATED : March 23, 1999
INVENTOR(S) : J.J.G.M. VAN DER TOL It is certified that error appears in the above-identified patent and that said Letters Patent is hereby corrected as shown below:

Column 9, line 15 (claim 5, line 2), delete "have been";

Column 9, line 16 (claim 5, line 3), change "designed as" to --comprise--;

Column 9, line 17 (claim 5, line 4), delete "that"; and change "are" to --comprise--;

Column 10, line 2, after "and" insert --the--;

Column 10, line 4 (claim 6, line 2), delete "have been";

Column 10, line 5 (claim 6, line 3), change " designed as" to --comprise--;

Column 10, line 6 (claim 6, line 4), delete "that";

UNITED STATES PATENT AND TRADEMARK OFFICE
CERTIFICATE OF CORRECTION

PATENT NO. : 5,887,092
DATED : March 23, 1999
INVENTOR(S) : J.J.G.M. VAN DER TOL It is certified that error appears in the above-identified patent and that said Letters Patent is hereby corrected as shown below:

Column 10, line 7 (claim 6, line 5), change "are" to --comprise--;

Column 10, line 8 (claim 6, line 6), change ", which" to --that--;

Column 10, line 10 (claim 6 , line 8), after "and" insert --the--;

Column 10, line 11 (claim 7, line 1), delete "or";

Column 10, line 12 (claim 7, line 2), delete "3," and delete "have";

Column 10, line 13 (claim 7, line 3), change "been designed as" to --comprise--;

UNITED STATES PATENT AND TRADEMARK OFFICE
CERTIFICATE OF CORRECTION

PATENT NO. : 5,887,092
DATED : March 23, 1999
INVENTOR(S) : J.J.G.M. VAN DER TOL It is certified that error appears in the above-identified patent and that said Letters Patent is hereby corrected as shown below:

Column 10, line 14 (claim 7, line 4), delete "that" and change "are" to --comprise--;

Column 10, line 17 (claim 7, line 7), after "and" insert --the--.

Signed and Sealed this

Eighteenth Day of April, 2000

Attest:

Q. TODD DICKINSON

Attesting Officer

Director of Patents and Trademarks